United States Patent
Fukuda

[11] Patent Number: 5,855,407
[45] Date of Patent: Jan. 5, 1999

[54] REAR PILLAR REINFORCING STRUCTURE OF VEHICLE

[75] Inventor: Makoto Fukuda, Saitama-ken, Japan

[73] Assignee: Honda Giken Kogyo Kabushiki Kaisha, Tokyo, Japan

[21] Appl. No.: 800,238

[22] Filed: Feb. 12, 1997

[30] Foreign Application Priority Data

Feb. 14, 1996 [JP] Japan ................... 8-027016
Feb. 14, 1996 [JP] Japan ................... 8-027017

[51] Int. Cl.$^6$ .......................................................... B60J 7/00
[52] U.S. Cl. ................................ 296/203.03; 296/203.04
[58] Field of Search ............................... 296/187, 188, 296/189, 195, 203, 204, 29, 30, 203.01, 203.02, 203.03, 203.04

[56] References Cited

U.S. PATENT DOCUMENTS

| 4,775,181 | 10/1988 | Shoda | 296/203 |
| 4,971,359 | 11/1990 | Takahashi et al. | 296/203 |
| 4,973,103 | 11/1990 | Imajyo et al. | 296/203 |
| 5,018,781 | 5/1991 | Kumasaka et al. | 296/203 |

*Primary Examiner*—Stephen Avila
*Attorney, Agent, or Firm*—Armstrong, Westerman, Hattori, McLeland & Naughton

[57] ABSTRACT

Extension portions 5b, 5c which extend towards a side roof rail 3 and towards a rear roof rail 4, respectively, are formed in an anchor reinforcing member 5 which is for mounting thereon an anchor bolt 6 and which is connected to an upper portion of a rear pillar 1. Each of the extension portions 5b, 5c is connected to the side roof rail 3 and the rear roof rail 4, respectively. In case hinge reinforcing members 9 for mounting thereon hinges 8a for a tail gate 8 are provided on the rear roof rail 4, the hinge reinforcing members 9 are each combined with that extension portion 5c of the anchor reinforcing member 5 which extends towards the rear roof rail 4.

2 Claims, 8 Drawing Sheets

REAR PILLAR REINFORCING STRUCTURE OF VEHICLE

BACKGROUND OF THE INVENTION

1. Field of the Invention

The present invention relates to a reinforcing structure of rear pillars of a vehicle such as a motor vehicle, the rear pillars having mounted on each upper portion thereof an anchor bolt for a seat belt.

2. Description of the Related Art

In case an anchor bolt is mounted on an upper portion of a rear pillar, the following arrangement is conventionally employed. Namely, an anchor reinforcing member (i.e., a reinforcing member for attaching thereto an anchor bolt) is mounted on an inner member of the rear pillar, and a nut is fixed to the anchor reinforcing member to thereby fasten the anchor bolt thereto.

Further, in case a tailgate is provided in a rear portion of a motor vehicle body, the following arrangement is conventionally employed. Namely, hinge reinforcing members (i.e., reinforcing members for attaching thereto hinges) are provided on a rear roof rail, and hinges for the tail gate are attached to the hinge reinforcing members. The anchor reinforcing member and the hinge reinforcing members are independently or separately provided.

In the above-described conventional arrangements, the rear pillar is only partially reinforced by the anchor reinforcing member at a portion in which the anchor bolt is mounted. In order to improve the supporting rigidity of the anchor bolt, the rigidity of the rear pillar itself must also be increased. Therefore, the plate thicknesses of the inner member and an outer member of the rear pillar must be increased, resulting in an increase in weight.

In addition, in increasing the rigidity of the motor vehicle body, the connecting or combining strength between the rear pillar and the rear roof rail becomes an important factor. Conventionally, the combining strength between the rear pillar and the rear roof rail is improved either by increasing the plate thicknesses of the rear roof rail and a rear pillar inner member that is connected to, or combined with, the rear roof rail or by providing a reinforcing member that is combined to bridge the rear roof rail and the rear pillar inner member. This arrangement has, however, a disadvantage in that the weight increases or that the steps of assembling the motor vehicle body increase.

In view of the above-described disadvantages, the present invention has an object of providing a reinforcing structure in which the supporting rigidity of the anchor bolt can be improved without increasing the rigidity of the rear pillar itself, and in which the combining strength between the rear pillar and the rear roof rail can be improved without using a reinforcing member that is prepared exclusively for that purpose.

SUMMARY OF THE INVENTION

In order to attain the above object, the present invention is a rear pillar reinforcing structure of a vehicle comprising an anchor reinforcing member provided in an upper portion of a rear pillar of the vehicle, the anchor reinforcing member being for mounting thereon an anchor bolt for a seat belt. The anchor reinforcing member comprises an extension portion formed to extend towards a side roof rail and an extension portion formed to extend towards a rear roof rail. The extension portions are combined with the side roof rail and the rear roof rail, respectively.

According to the present invention, loads that operate via the anchor bolt can be received, by sharing them via the anchor reinforcing member, among three members of the rear pillar that extends in the direction of the vehicle height, the side roof rail that extends in the direction of the vehicle length, and the rear roof rail that extends in the direction of the vehicle width. Therefore, the rigidity of the anchor bolt in the direction of the vehicle height, in the direction of the vehicle length and in the direction of the vehicle width can be improved without increasing the rigidity of the rear pillar itself.

In addition, the anchor reinforcing member functions as a reinforcing member that bridges between the rear pillar and the rear roof rail. Therefore, the combining strength between the rear pillar and the rear roof rail can also be improved.

In case a hinge reinforcing member is provided on the rear roof rail, the hinge reinforcing member is combined with that extension portion of the anchor reinforcing member which extends towards the rear roof rail. In this arrangement, the combining strength between the rear pillar and the rear roof rail can further be improved.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

The present invention will now be explained with reference to an embodiment in which the present invention is applied to the reinforcing of a rear pillar 1 of a vehicle such as a motor vehicle.

Figure 1:
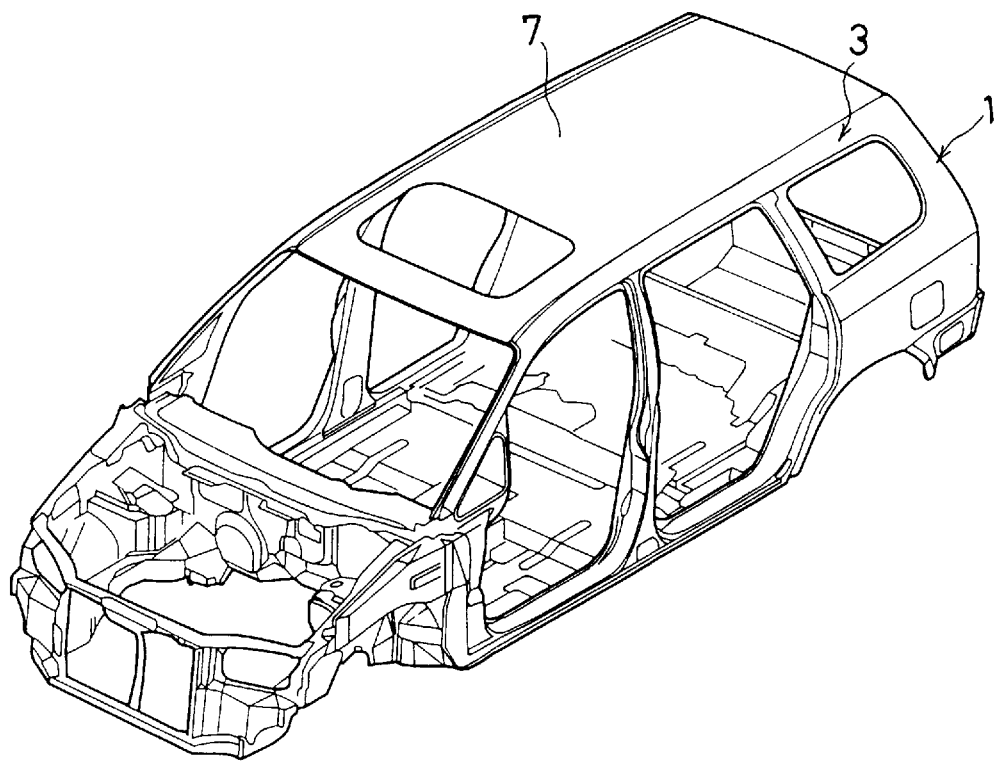
FIG. 1 is a perspective view showing an example of a vehicle to which the present invention is applied.
Figure 2:
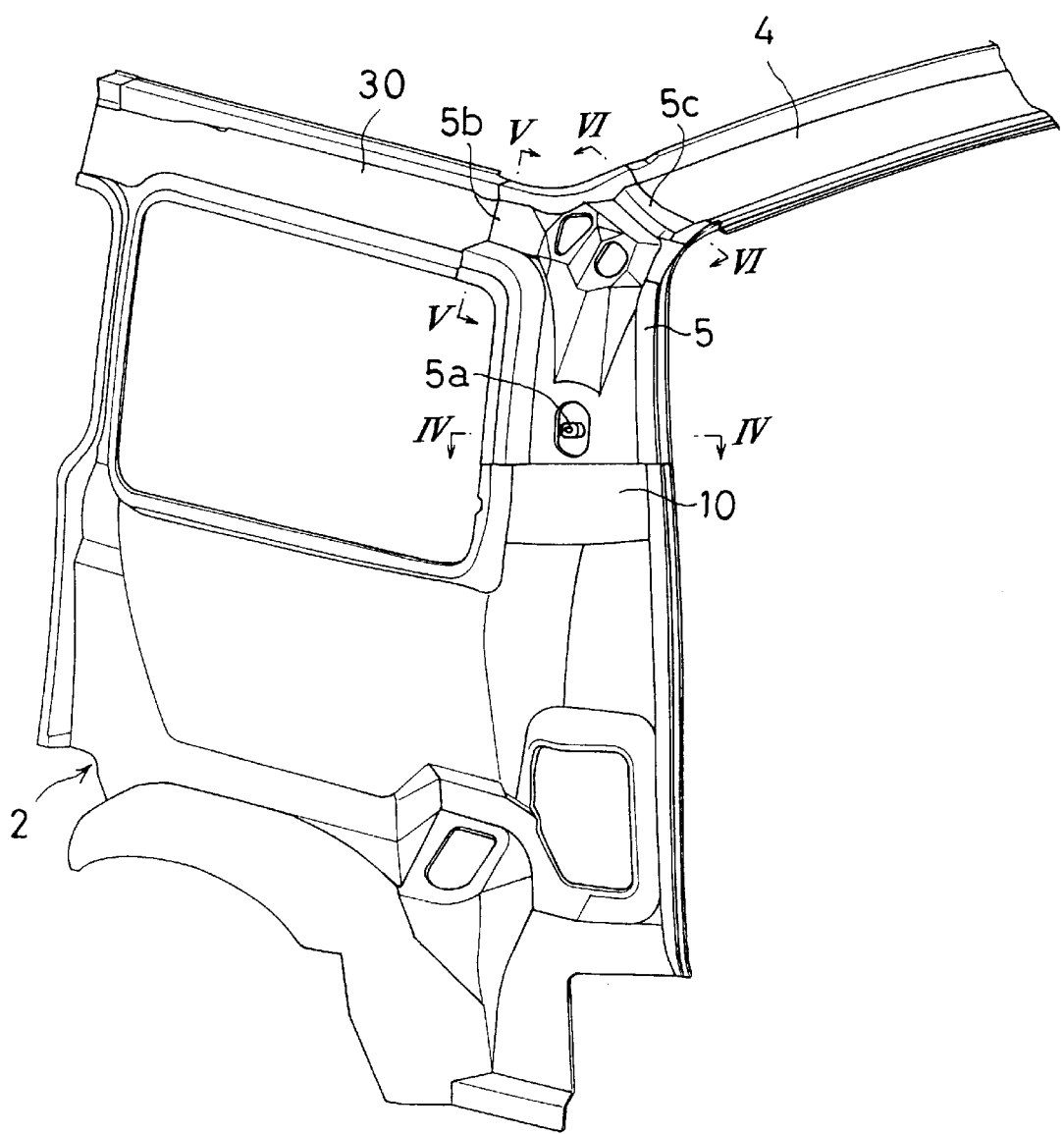
FIG. 2 is a perspective view of an important portion thereof with an outer member being omitted.

With reference to FIG. 2, reference numeral 2 denotes a rear inner member of a side panel. In the rear inner member 2, there are provided a rear pillar inner member 10 in a rear end, and a side roof rail inner member 30 on an upper end. To an upper end of the rear pillar inner member 10, there is connected or combined a rear roof rail 4.

Figure 3:
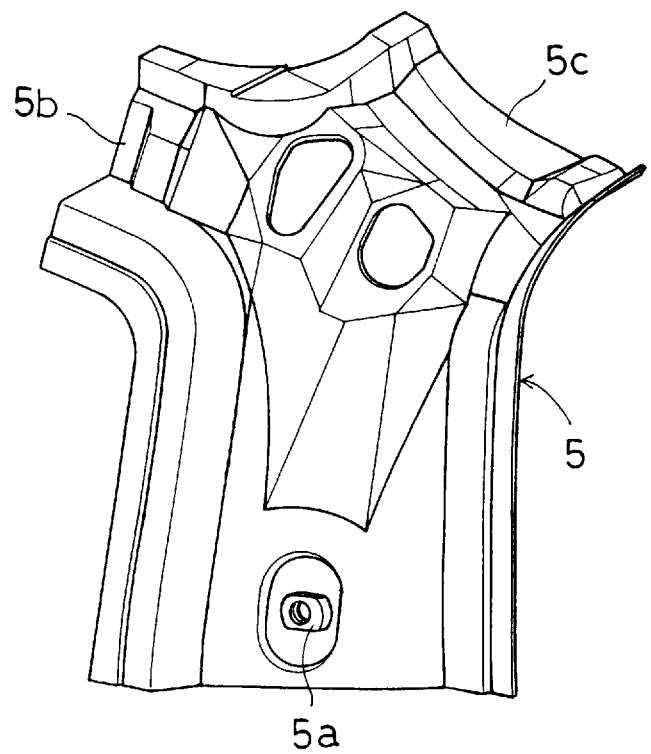
FIG. 3 is a perspective view of an anchor reinforcing member.
Figure 4:
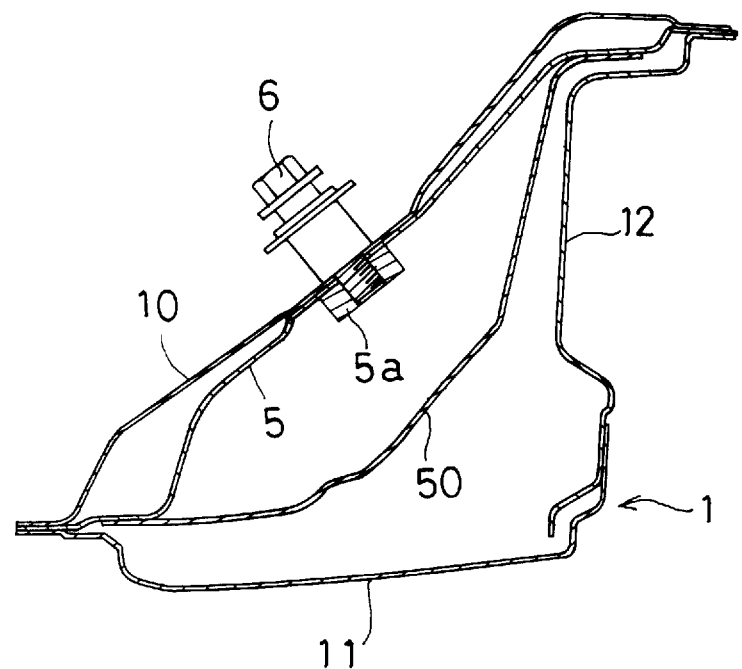
FIG. 4 is a sectional view showing an assembled condition of the vehicle taken along the line IV—IV in FIG. 2.

To an upper portion of the rear pillar inner member 10, there is combined an anchor reinforcing member 5 as shown in FIG. 3. A nut 5a is fixed to a lower outer surface of the anchor reinforcing member 5 and, as shown in FIG. 4, an anchor bolt 6 for a seat belt is arranged to be fastened through the rear pillar inner member 10. Though not illustrated in FIGS. 2 and 3, the anchor reinforcing member 5 is provided, as shown in FIG. 4, with a stiffener 50. The rear pillar 1 is formed into a hollow cross section by the rear pillar inner member 10, a rear pillar outer member 11 which is formed in a rear outer member of the side panel, and a rear pillar gutter member 12 which is combined between rear ends of both members 10, 11.

Figure 5:
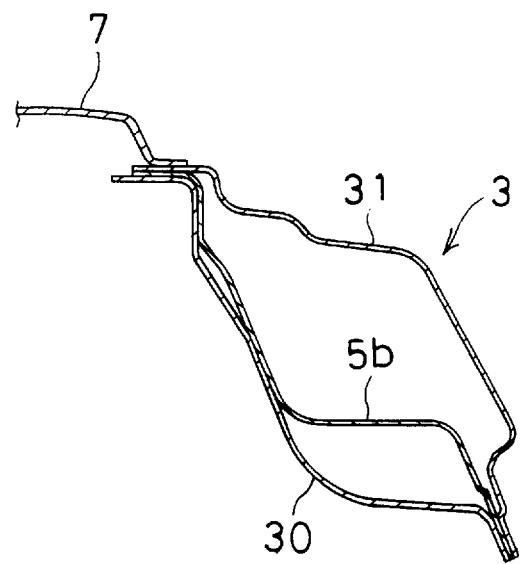
FIG. 5 is a sectional view showing an assembled condition of the vehicle taken along the line V—V in FIG. 2.
Figure 6:
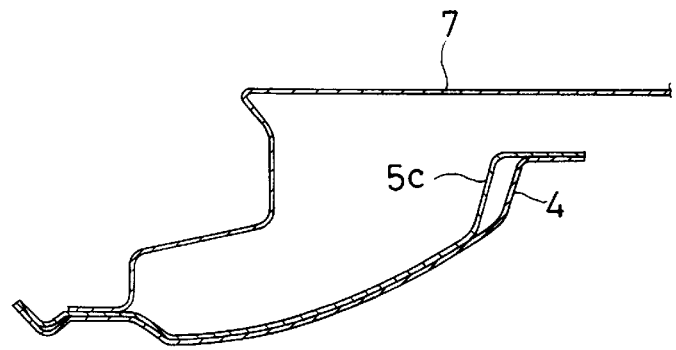
FIG. 6 is a sectional view showing an assembled condition of the vehicle taken along the line VI—VI in FIG. 2.

On an upper end of the anchor reinforcing member 5, there are formed an extension portion 5b which extends towards a side roof rail 3, and an extension portion 5c which extends towards the rear roof rail 4. The extension portion 5b is combined with the side roof rail inner member 30 as shown in FIG. 5, and the extension portion 5c is combined with the rear roof rail 4 as shown in FIG. 6. The side roof rail 3 is formed into a hollow cross section by the side roof rail inner member 30 and a side roof rail outer member 31 which is formed in a rear outer member of the side panel. In the figure, reference numeral 7 denotes a roof panel.

According to the above-described arrangements, those loads in the downward, forward and lateral directions which operate on the anchor reinforcing member 5 via the anchor bolt 6 can be received by sharing them among the rear pillar 1, the side roof rail 3 and the rear roof rail 4. Therefore, the supporting rigidity of the anchor bolt 6 can be secured without increasing so much the rigidity of the rear pillar 1 itself. In addition, the anchor reinforcing member 5 contributes to the improvement in the combining strength between the rear pillar 1 and the rear roof rail 4.

Figure 7:
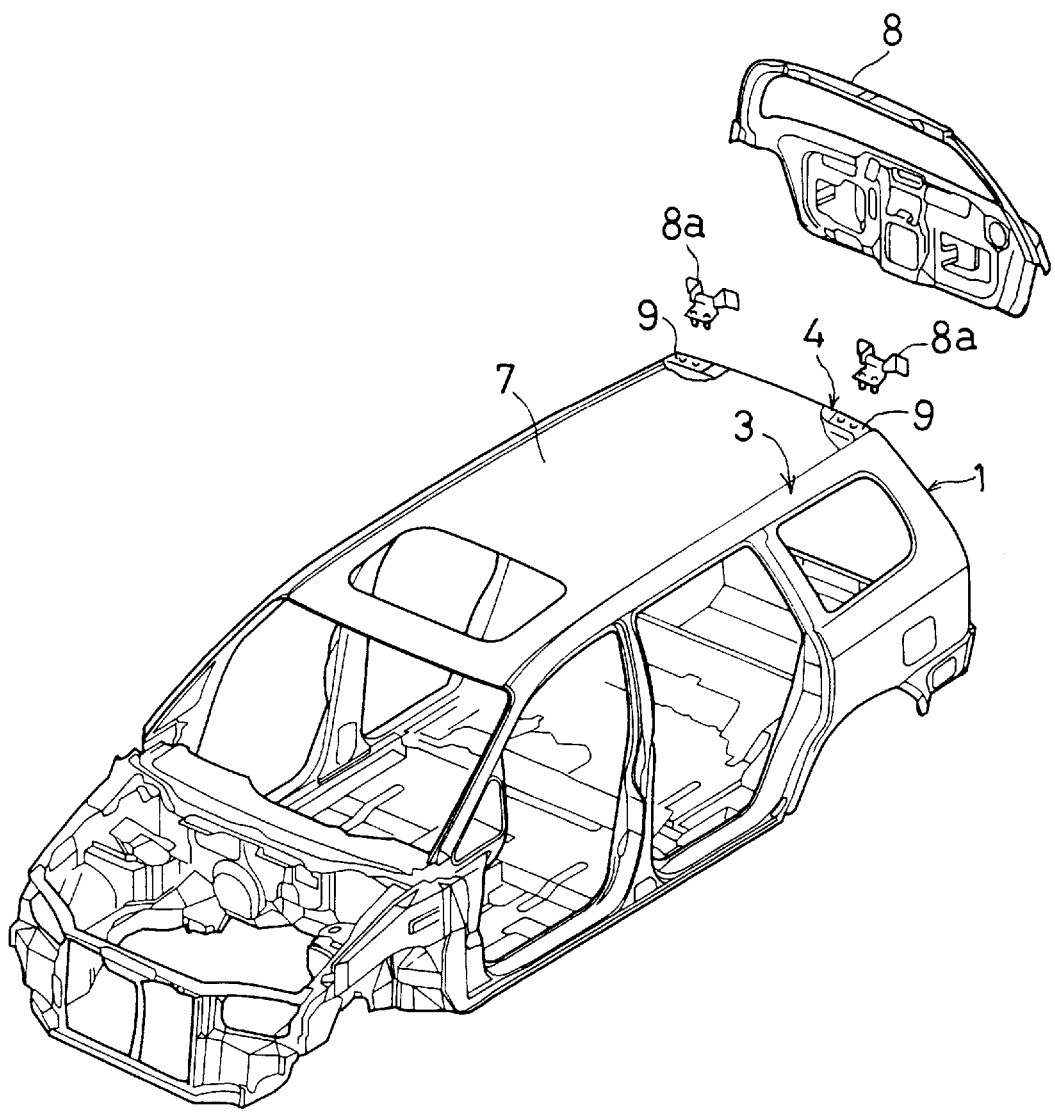
FIG. 7 is an exploded perspective view showing another example of a vehicle to which the present invention is applied.
Figure 8:
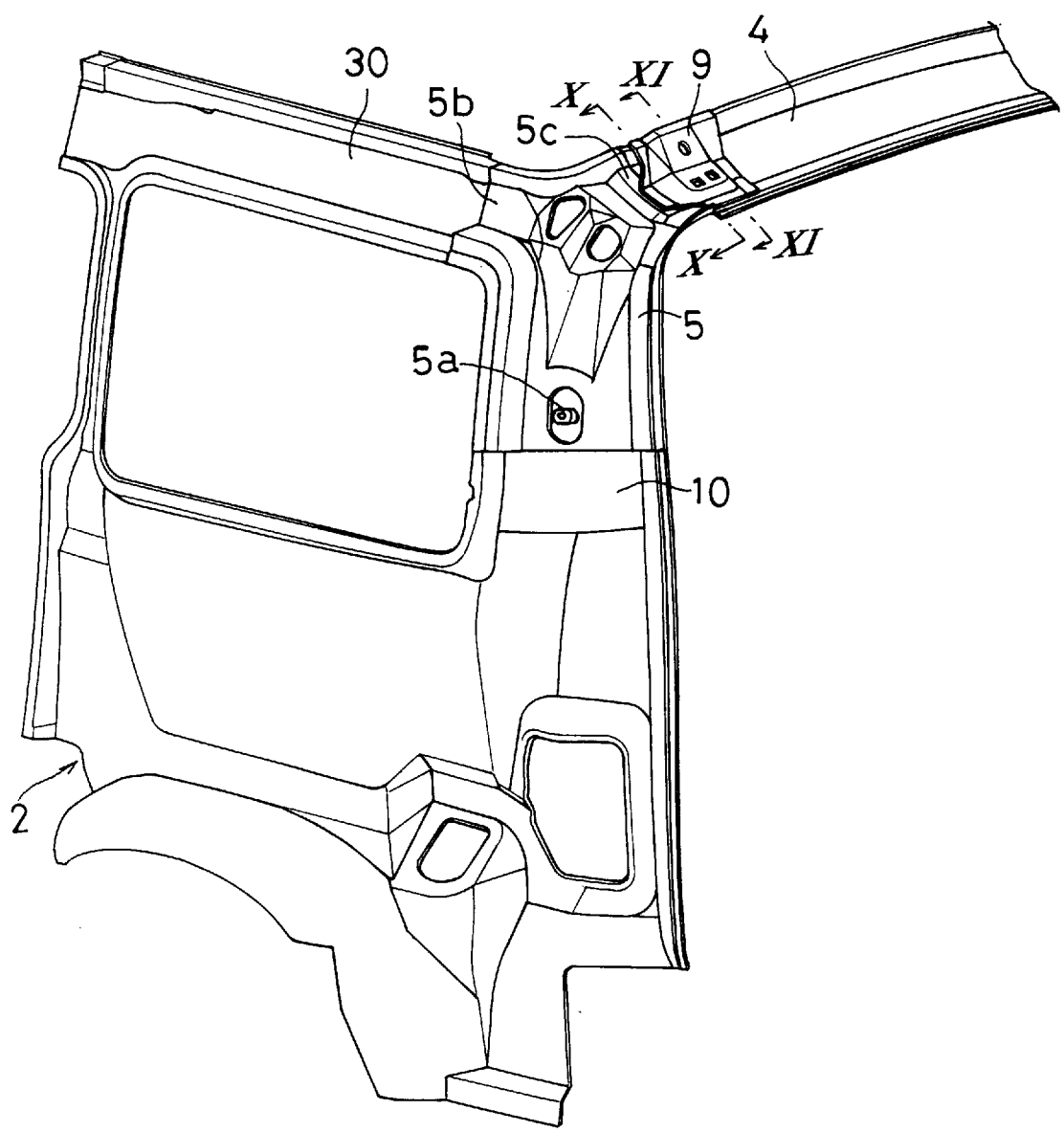
FIG. 8 is a perspective view of an important portion thereof with an outer member being omitted.

Next, with reference to FIGS. 8 through 11, an explanation will now be made about an embodiment in which the present invention is applied to a vehicle such as a motor vehicle having a tail gate 8 at the rear portion thereof as shown in FIG. 7. The difference between this embodiment and the above-described embodiment is that hinge reinforcing members 9 for mounting thereon hinges 8a for the tail gate 8 are combined with end portions of the rear roof rail 4. The remaining constitution is substantially the same as that of the above-described embodiment. Therefore, the same reference numerals are affixed to the same members as those of the above-described embodiment, and their explanations are omitted.

Figure 11:
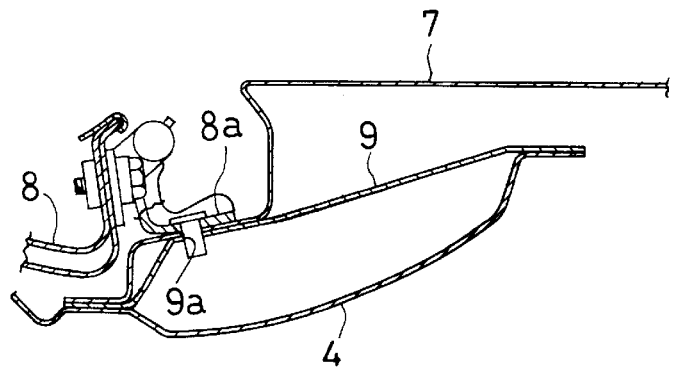
FIG. 11 is a sectional view showing an assembled condition of the vehicle taken along the line XI—XI in FIG. 8.

In each of the hinge reinforcing members 9 there are formed mounting holes 9a. Each of the hinges 8a for the tail gate 8 is riveted through the mounting holes 9a to the respective hinge reinforcing member 9 as shown in FIG. 11. The tail gate 8 is combined, after assembling of the motor vehicle body, with the motor vehicle body so as to be opened and closed by bolting an upper end portion of the tail gate 8 to the hinges 8a.

Figure 10:
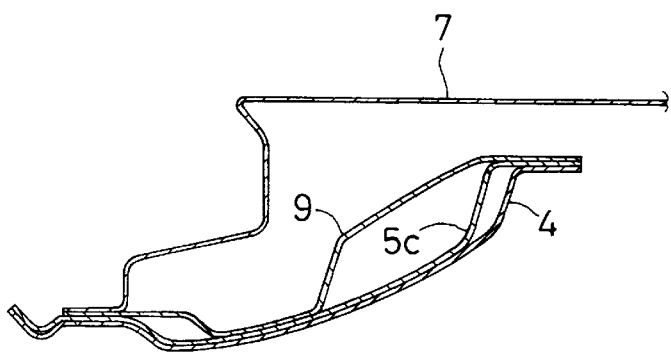
FIG. 10 is a sectional view showing an assembled condition of the vehicle taken along the line X—X in FIG. 8.
Figure 9:
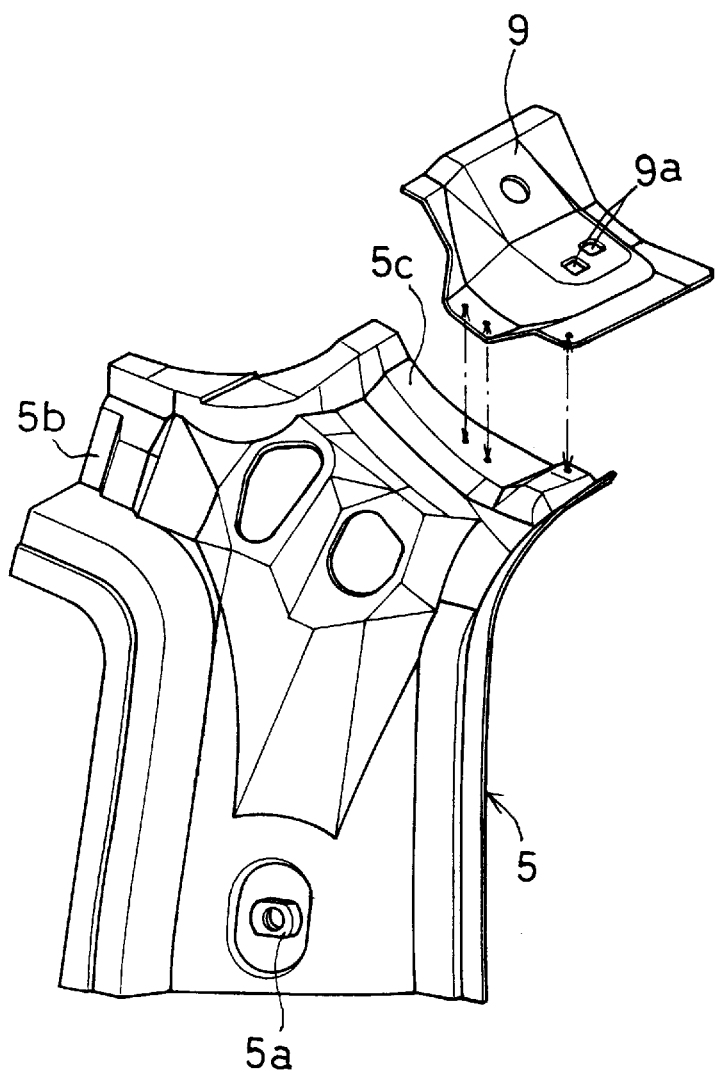
FIG. 9 is a perspective view showing an anchor reinforcing member and a hinge reinforcing member.

An end portion of each hinge reinforcing member 9 is combined, as shown in FIGS. 9 and 10, with that extension portion 5c of the anchor reinforcing member 5 which is combined with the rear roof rail 4.

According to this arrangement, the rear pillar 1 and the rear roof rail 4 are combined also via the anchor reinforcing member 5 and the hinge reinforcing member 9. It is therefore possible to improve the combining strength between the rear pillar 1 and the rear roof rail 4 without increasing the thicknesses of the constituting members of the rear pillar 1 and of the rear roof rail 4, or else without providing a separate reinforcing member for the combining portion.

In addition, the downward, lateral and forward loads that operate on the anchor reinforcing member 5 via the anchor bolt 6 can be received by sharing them among the rear pillar 1, the rear roof rail 4 and the side roof rail 3. The supporting rigidity of the anchor bolt can thus be improved.

It is readily apparent that the above-described rear pillar reinforcing structure of a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A rear pillar reinforcing structure for a vehicle having an end of each of a rear pillar inner member, a side roof rail inner member and a rear roof rail having oppositely spaced, parallel outer flanges and being in mutually intersecting disposition, and an anchor reinforcing member disposed in overlying opposition to and interconnecting each of said rear pillar inner member, said side roof rail inner member and said rear roof rail, said anchor reinforcing member comprising:

a body portion;

a bifurcated upper portion integrally formed on the upper end of said body portion to define first and second extension portions extending oppositely outwardly from said body portion;

each of said body portion and said first and second extension portions having oppositely spaced, parallel outer flanges arranged to overlie the parallel outer flanges on said rear pillar inner member, said side roof rail inner member and said rear roof rail, respectively, and being fixedly connected thereto; and a nut fixedly attached to the body portion of said anchor reinforcing member, said nut containing a threaded opening for mounting an anchor bolt for a seat belt.

2. A rear pillar reinforcing structure according to claim 1, further including a hinge reinforcing member disposed between said second extension portion and said roof rail, said hinge reinforcing member having oppositely spaced, parallel outer flanges connected to said parallel outer flanges on said second extension portion and said rear roof rail, respectively; and means on said hinge reinforcing member for mounting a hinge for a tail gate.

* * * * *